(12) United States Patent
Adams et al.

(10) Patent No.: US 9,223,846 B2
(45) Date of Patent: Dec. 29, 2015

(54) CONTEXT-BASED NAVIGATION THROUGH A DATABASE

(71) Applicant: INTERNATIONAL BUSINESS MACHINES CORPORATION, Armonk, NY (US)

(72) Inventors: Samuel S. Adams, Rutherfordton, NC (US); Robert R. Friedlander, Southbury, CT (US); James R. Kraemer, Santa Fe, NM (US)

(73) Assignee: International Business Machines Corporation, Armonk, NY (US)

( * ) Notice: Subject to any disclaimer, the term of this patent is extended or adjusted under 35 U.S.C. 154(b) by 423 days.

(21) Appl. No.: 13/621,931

(22) Filed: Sep. 18, 2012

(65) Prior Publication Data

US 2014/0081939 A1 Mar. 20, 2014

(51) Int. Cl.
*G06F 17/30* (2006.01)

(52) U.S. Cl.
CPC .... *G06F 17/30589* (2013.01); *G06F 17/30477* (2013.01)

(58) Field of Classification Search
USPC .......................................... 707/769, 776, 778
See application file for complete search history.

(56) References Cited

U.S. PATENT DOCUMENTS

| | | | |
|---|---|---|---|
| 5,450,535 A | 9/1995 | North | |
| 5,664,179 A | 9/1997 | Tucker | |
| 5,689,620 A | 11/1997 | Kopec et al. | |
| 5,701,460 A | 12/1997 | Kaplan et al. | |
| 5,943,663 A | 8/1999 | Mouradian | |
| 5,974,427 A | 10/1999 | Reiter | |
| 6,199,064 B1 | 3/2001 | Schindler | |
| 6,275,833 B1 | 8/2001 | Nakamura et al. | |
| 6,314,555 B1 | 11/2001 | Ndumu et al. | |
| 6,334,156 B1 | 12/2001 | Matsuoka et al. | |
| 6,381,611 B1 | 4/2002 | Roberge et al. | |

(Continued)

FOREIGN PATENT DOCUMENTS

| | | |
|---|---|---|
| EP | 1566752 A2 | 8/2005 |
| EP | 1843259 A2 | 10/2007 |

(Continued)

OTHER PUBLICATIONS

Faulkner, Paul, "Common Patterns for Synthetic Events in Websphere Business Events," Jan. 15, 2011, http://www.ibm.com/developerworks/websphere/bpmjournal/1101_faulkner2/1101_faulkner2.html, pp. 1-6.

(Continued)

*Primary Examiner* — Sherief Badawi
*Assistant Examiner* — Christopher J Raab
(74) *Attorney, Agent, or Firm* — John R. Pivnichny; Law Office of Jim Boice (57) ABSTRACT

A processor-implemented method, system, and/or computer program product navigates through a database. A non-contextual data object, which ambiguously relates to multiple subject-matters, is associated with a context object to define a synthetic context-based object. The context object provides a context that identifies a specific subject-matter, from the multiple subject-matters, of the non-contextual data object. The synthetic context-based object is associated with a first data node and a second data node within a database. In response to receiving a request for identifying and retrieving data from a data node that has a same context as the first data node, data from the second data node is retrieved.

15 Claims, 8 Drawing Sheets

(56) References Cited

U.S. PATENT DOCUMENTS

| | | |
|---|---|---|
| 6,405,162 B1 | 6/2002 | Segond et al. |
| 6,424,969 B1 | 7/2002 | Gruenwald |
| 6,553,371 B2 | 4/2003 | Gutierrez-Rivas et al. |
| 6,633,868 B1 | 10/2003 | Min et al. |
| 6,735,593 B1 | 5/2004 | Williams |
| 6,768,986 B2 | 7/2004 | Cras et al. |
| 6,925,470 B1 | 8/2005 | Sangudi et al. |
| 6,990,480 B1 | 1/2006 | Burt |
| 7,058,628 B1 | 6/2006 | Page |
| 7,103,836 B1 | 9/2006 | Nakamura et al. |
| 7,209,923 B1 | 4/2007 | Cooper |
| 7,337,174 B1 | 2/2008 | Craig |
| 7,441,264 B2 | 10/2008 | Himmel et al. |
| 7,493,253 B1 | 2/2009 | Ceusters et al. |
| 7,523,118 B2 | 4/2009 | Friedlander et al. |
| 7,523,123 B2 | 4/2009 | Yang et al. |
| 7,571,163 B2 | 8/2009 | Trask |
| 7,702,605 B2 | 4/2010 | Friedlander et al. |
| 7,748,036 B2 | 6/2010 | Speirs, III et al. |
| 7,752,154 B2 | 7/2010 | Friedlander et al. |
| 7,778,955 B2 | 8/2010 | Kuji |
| 7,783,586 B2 | 8/2010 | Friedlander et al. |
| 7,788,202 B2 | 8/2010 | Friedlander et al. |
| 7,788,203 B2 | 8/2010 | Friedlander et al. |
| 7,792,774 B2 | 9/2010 | Friedlander et al. |
| 7,792,776 B2 | 9/2010 | Friedlander et al. |
| 7,792,783 B2 | 9/2010 | Friedlander et al. |
| 7,797,319 B2 | 9/2010 | Piedmonte |
| 7,805,390 B2 | 9/2010 | Friedlander et al. |
| 7,805,391 B2 | 9/2010 | Friedlander et al. |
| 7,809,660 B2 | 10/2010 | Friedlander et al. |
| 7,853,611 B2 | 12/2010 | Friedlander et al. |
| 7,870,113 B2 | 1/2011 | Gruenwald |
| 7,877,682 B2 | 1/2011 | Aegerter |
| 7,925,610 B2 | 4/2011 | Elbaz et al. |
| 7,930,262 B2 | 4/2011 | Friedlander et al. |
| 7,940,959 B2 | 5/2011 | Rubenstein |
| 7,953,686 B2 | 5/2011 | Friedlander et al. |
| 7,970,759 B2 | 6/2011 | Friedlander et al. |
| 7,996,393 B1 | 8/2011 | Nanno et al. |
| 8,032,508 B2 | 10/2011 | Martinez et al. |
| 8,046,358 B2 | 10/2011 | Thattil |
| 8,055,603 B2 | 11/2011 | Angell et al. |
| 8,069,188 B2 | 11/2011 | Larson et al. |
| 8,086,614 B2 | 12/2011 | Novy |
| 8,095,726 B1 | 1/2012 | O'Connell et al. |
| 8,145,582 B2 | 3/2012 | Angell et al. |
| 8,150,882 B2 | 4/2012 | Meek et al. |
| 8,155,382 B2 | 4/2012 | Rubenstein |
| 8,161,048 B2 | 4/2012 | Procopiuc et al. |
| 8,199,982 B2 | 6/2012 | Fueyo et al. |
| 8,234,285 B1 | 7/2012 | Cohen |
| 8,250,581 B1 | 8/2012 | Blanding et al. |
| 8,341,626 B1 | 12/2012 | Gardner et al. |
| 8,447,273 B1 | 5/2013 | Friedlander et al. |
| 8,457,355 B2 | 6/2013 | Brown et al. |
| 8,620,958 B1 | 12/2013 | Adams et al. |
| 8,799,323 B2 | 8/2014 | Nevin, III |
| 8,849,907 B1 | 9/2014 | Hession et al. |
| 2002/0091677 A1 | 7/2002 | Sridhar |
| 2002/0111792 A1 | 8/2002 | Cherny |
| 2002/0184401 A1 | 12/2002 | Kadel et al. |
| 2003/0065626 A1 | 4/2003 | Allen |
| 2003/0088576 A1 | 5/2003 | Hattori et al. |
| 2003/0149562 A1 | 8/2003 | Walther |
| 2003/0149934 A1 | 8/2003 | Worden |
| 2003/0212851 A1 | 11/2003 | Drescher et al. |
| 2004/0111410 A1 | 6/2004 | Burgoon et al. |
| 2004/0153461 A1 | 8/2004 | Brown et al. |
| 2004/0162838 A1 | 8/2004 | Murayama et al. |
| 2004/0249789 A1 | 12/2004 | Kapoor et al. |
| 2005/0050030 A1 | 3/2005 | Gudbjartsson et al. |
| 2005/0165866 A1 | 7/2005 | Bohannon et al. |
| 2005/0181350 A1 | 8/2005 | Benja-Athon |
| 2005/0222890 A1 | 10/2005 | Cheng et al. |
| 2005/0273730 A1 | 12/2005 | Card et al. |
| 2006/0004851 A1 | 1/2006 | Gold et al. |
| 2006/0036568 A1 | 2/2006 | Moore et al. |
| 2006/0190195 A1 | 8/2006 | Watanabe et al. |
| 2006/0197762 A1 | 9/2006 | Smith et al. |
| 2006/0200253 A1 | 9/2006 | Hoffberg et al. |
| 2006/0256010 A1 | 11/2006 | Tanygin et al. |
| 2006/0271586 A1 | 11/2006 | Federighi et al. |
| 2006/0290697 A1 | 12/2006 | Madden et al. |
| 2007/0006321 A1 | 1/2007 | Bantz et al. |
| 2007/0016614 A1 | 1/2007 | Novy |
| 2007/0038651 A1 | 2/2007 | Bernstein et al. |
| 2007/0067343 A1 | 3/2007 | Mihaila et al. |
| 2007/0073734 A1 | 3/2007 | Doan et al. |
| 2007/0079356 A1 | 4/2007 | Grinstein |
| 2007/0088663 A1 | 4/2007 | Donahue |
| 2007/0130182 A1 | 6/2007 | Forney |
| 2007/0136048 A1 | 6/2007 | Richardson-Bunbury et al. |
| 2007/0185850 A1 | 8/2007 | Walters et al. |
| 2007/0239710 A1 | 10/2007 | Jing et al. |
| 2007/0282916 A1 | 12/2007 | Albahari et al. |
| 2007/0300077 A1 | 12/2007 | Mani et al. |
| 2008/0065655 A1 | 3/2008 | Chakravarthy et al. |
| 2008/0066175 A1 | 3/2008 | Dillaway et al. |
| 2008/0086442 A1 | 4/2008 | Dasdan et al. |
| 2008/0091503 A1 | 4/2008 | Schirmer et al. |
| 2008/0133474 A1 | 6/2008 | Hsiao et al. |
| 2008/0159317 A1 | 7/2008 | Iselborn et al. |
| 2008/0172715 A1 | 7/2008 | Geiger et al. |
| 2008/0208813 A1 | 8/2008 | Friedlander et al. |
| 2008/0208838 A1 | 8/2008 | Friedlander et al. |
| 2008/0208901 A1 | 8/2008 | Friedlander et al. |
| 2008/0281801 A1 | 11/2008 | Larson et al. |
| 2008/0306926 A1 | 12/2008 | Friedlander et al. |
| 2009/0024553 A1 | 1/2009 | Angell et al. |
| 2009/0064300 A1 | 3/2009 | Bagepalli et al. |
| 2009/0080408 A1 | 3/2009 | Natoli et al. |
| 2009/0125546 A1 | 5/2009 | Iborra et al. |
| 2009/0144609 A1 | 6/2009 | Liang et al. |
| 2009/0164649 A1 | 6/2009 | Kawato |
| 2009/0165110 A1* | 6/2009 | Becker et al. ............... 726/9 |
| 2009/0177484 A1 | 7/2009 | Davis et al. |
| 2009/0287676 A1 | 11/2009 | Dasdan |
| 2009/0299988 A1 | 12/2009 | Hamilton et al. |
| 2009/0327632 A1 | 12/2009 | Glaizel et al. |
| 2010/0030780 A1 | 2/2010 | Eshghi et al. |
| 2010/0070640 A1 | 3/2010 | Allen et al. |
| 2010/0077033 A1 | 3/2010 | Lowry |
| 2010/0088322 A1 | 4/2010 | Chowdhury et al. |
| 2010/0131293 A1 | 5/2010 | Linthicum et al. |
| 2010/0169137 A1 | 7/2010 | Jastrebski et al. |
| 2010/0169758 A1 | 7/2010 | Thomsen |
| 2010/0174692 A1 | 7/2010 | Meyer et al. |
| 2010/0179933 A1 | 7/2010 | Bai et al. |
| 2010/0191743 A1* | 7/2010 | Perronnin et al. ............ 707/748 |
| 2010/0191747 A1 | 7/2010 | Ji et al. |
| 2010/0241644 A1 | 9/2010 | Jackson et al. |
| 2010/0257198 A1 | 10/2010 | Cohen et al. |
| 2010/0268747 A1 | 10/2010 | Kern et al. |
| 2010/0274785 A1 | 10/2010 | Procopiuc et al. |
| 2011/0040724 A1 | 2/2011 | Dircz |
| 2011/0066649 A1 | 3/2011 | Berlyant et al. |
| 2011/0077048 A1 | 3/2011 | Busch |
| 2011/0087678 A1 | 4/2011 | Frieden et al. |
| 2011/0093479 A1 | 4/2011 | Fuchs |
| 2011/0098056 A1 | 4/2011 | Rhoads et al. |
| 2011/0123087 A1 | 5/2011 | Nie et al. |
| 2011/0137882 A1 | 6/2011 | Weerasinghe |
| 2011/0194744 A1 | 8/2011 | Wang et al. |
| 2011/0208688 A1 | 8/2011 | Ivanov et al. |
| 2011/0246483 A1 | 10/2011 | Darr et al. |
| 2011/0246498 A1 | 10/2011 | Forster |
| 2011/0252045 A1 | 10/2011 | Garg et al. |
| 2011/0282888 A1 | 11/2011 | Koperski et al. |
| 2011/0299427 A1 | 12/2011 | Chu et al. |
| 2011/0301967 A1 | 12/2011 | Friedlander et al. |
| 2011/0314155 A1 | 12/2011 | Narayanaswamy et al. |
| 2012/0004891 A1 | 1/2012 | Rameau et al. |
| 2012/0005239 A1 | 1/2012 | Nevin, III |

(56) References Cited

U.S. PATENT DOCUMENTS

| | | | |
|---|---|---|---|
| 2012/0016715 A1 | 1/2012 | Brown et al. | |
| 2012/0023141 A1 | 1/2012 | Holster | |
| 2012/0072468 A1 | 3/2012 | Anthony et al. | |
| 2012/0079493 A1 | 3/2012 | Friedlander et al. | |
| 2012/0109640 A1 | 5/2012 | Anisimovich et al. | |
| 2012/0110004 A1 | 5/2012 | Meijer | |
| 2012/0110016 A1 | 5/2012 | Phillips | |
| 2012/0131139 A1 | 5/2012 | Siripurapu et al. | |
| 2012/0131468 A1 | 5/2012 | Friedlander et al. | |
| 2012/0166373 A1 | 6/2012 | Sweeney et al. | |
| 2012/0191704 A1 | 7/2012 | Jones | |
| 2012/0209858 A1 | 8/2012 | Lamba et al. | |
| 2012/0221439 A1 | 8/2012 | Sundaresan et al. | |
| 2012/0233194 A1 | 9/2012 | Ohyu et al. | |
| 2012/0239761 A1 | 9/2012 | Linner et al. | |
| 2012/0240080 A1 | 9/2012 | O'Malley | |
| 2012/0246148 A1 | 9/2012 | Dror | |
| 2012/0259841 A1 | 10/2012 | Hsiao et al. | |
| 2012/0278897 A1 | 11/2012 | Ang et al. | |
| 2012/0281830 A1 | 11/2012 | Stewart et al. | |
| 2012/0290950 A1 | 11/2012 | Rapaport et al. | |
| 2012/0297278 A1 | 11/2012 | Gattani et al. | |
| 2012/0311587 A1 | 12/2012 | Li et al. | |
| 2012/0316821 A1 | 12/2012 | Levermore et al. | |
| 2012/0330958 A1 | 12/2012 | Xu et al. | |
| 2013/0019084 A1 | 1/2013 | Orchard et al. | |
| 2013/0031302 A1 | 1/2013 | Byom et al. | |
| 2013/0060696 A1* | 3/2013 | Martin et al. | 705/44 |
| 2013/0103389 A1 | 4/2013 | Gattani et al. | |
| 2013/0124564 A1 | 5/2013 | Oztekin et al. | |
| 2013/0191392 A1 | 7/2013 | Kumar et al. | |
| 2013/0238667 A1 | 9/2013 | Carvalho et al. | |
| 2013/0246562 A1 | 9/2013 | Chong et al. | |
| 2013/0291098 A1 | 10/2013 | Chung et al. | |
| 2013/0331473 A1 | 11/2013 | Safovich et al. | |
| 2013/0326412 A1 | 12/2013 | Treiser | |
| 2013/0339379 A1* | 12/2013 | Ferrari et al. | 707/766 |
| 2014/0006411 A1 | 1/2014 | Boldyrev et al. | |
| 2014/0012884 A1 | 1/2014 | Bornea et al. | |
| 2014/0025702 A1 | 1/2014 | Curtiss et al. | |
| 2014/0074833 A1 | 3/2014 | Adams et al. | |
| 2014/0074885 A1 | 3/2014 | Adams et al. | |
| 2014/0074886 A1 | 3/2014 | Medelyan et al. | |
| 2014/0074892 A1 | 3/2014 | Adams et al. | |
| 2014/0098101 A1 | 4/2014 | Friedlander et al. | |
| 2014/0143891 A1 | 5/2014 | Adams et al. | |
| 2014/0214865 A1 | 7/2014 | Adams et al. | |
| 2014/0214871 A1 | 7/2014 | Adams et al. | |
| 2014/0250111 A1* | 9/2014 | Morton et al. | 707/723 |
| 2014/0344718 A1 | 11/2014 | Rapaport et al. | |

FOREIGN PATENT DOCUMENTS

| | | | |
|---|---|---|---|
| WO | 2006086179 A2 | 8/2006 | |
| WO | 2007044763 A2 | 4/2007 | |

OTHER PUBLICATIONS

Evaggelio Pitoura et al., "Context in Databases", University of Ioannina, Greece, 2004, pp. 1-19.

"Ninth New Collegiate Dictionary", Merriam-Webster Inc., 1991, pp. 77 and 242.

"The American Heritage College Dictionary", Fourth Edition, Houghton Mifflin Company, 2004, pp. 44 and 262.

U.S. Appl. No. 13/680,832—Non-Final Office Action Mailed Apr. 8, 2014.

U.S. Appl. No. 13/628,853—Notice of Allowance Mailed Mar. 4, 2014.

U.S. Appl. No. 13/540,267—Non-Final Office Action Mailed Feb. 4, 2014.

U.S. Appl. No. 13/540,230—Non-Final Office Action Mailed Jan. 30, 2014.

U.S. Appl. No. 13/540,295—Non-Final Office Action Mailed Jan. 30, 2014.

U.S. Appl. No. 13/609,710—Non-Final Office Action Mailed Jan. 27, 2014.

U.S. Appl. No. 13/342,406—Notice of Allowance Mailed Mar. 20, 2014.

U.S. Appl. No. 13/628,853—Non-Final Office Action Mailed Nov. 7, 2013.

U.S. Appl. No. 13/593,905—Notice of Allowance Mailed Oct. 25, 2013.

U.S. Appl. No. 13/595,356—Non-Final Office Action Mailed Apr. 14, 2014.

U.S. Appl. No. 13/755,623—Notice of Allowance Mailed May 27, 2014.

S. Alam et al., "Interoperability of Security-Enabled Internet of Things", Springer, Wireless Personal Communication, 2011, No. 61, pp. 567-586.

U.S. Appl. No. 13/648,801—Non-Final Office Action Mailed Jul. 1, 2014.

M.J. Flynn, et al, "Sparse Distributed Memory Principles of Operation", Research Institute for Advanced Computer Science, 1989, pp. 1-60.

P. Kanerva, "Hyperdimensional Computing: An Introduction to Computing in Distributed Representation With High-Dimensional Random Vectors", Springer Science+Business Media, LLC, Cogn Comput, 1, 2009, pp. 139-159.

P. Kanerva, "What We Mean When We Say "What's the Dollar of Mexico?": Prototypes and Mapping in Concept Space", Quantum Informatics for Cognitive, Social, and Semantic Processes: Papers From the AAAI Fall Symposium, Association for the Advancement of Artificial Intelligence, 2010, pp. 2-6.

M. Yu, et al., "Secure and Robust Error Correction for Physical Unclonable Functions", Verifying Physical Trustworthiness of ICS and Systems, IEEE Design & Test of Computers, IEEE, Jan./Feb. 2010, pp. 48-64.

A. Jin, et al., "Biohashing: Two Factor Authentication Featuring Fingerprint Data and Tokenised Random Number," Pattern Recognition 37, Elsevier Ltd., 2004, pp. 2245-2255.

N. Saxena et al., "Data remanence effects on memory-based entropy collection for RFID systems", International Journal of Information Security 10.4 (2011), pp. 213-222.

A. Birrell et al., "A design for high-performance flash disks." ACM SIGOPS Operating Systems Review 41.2 (2007), pp. 88-93.

Richard Saling, "How to Give a Great Presentation! From the HP Learning Center", Jul. 28, 2008, <http://rsaling.wordpress.com/2008/07/28/how-to-give-a-great-presentation/>, pp. 1-28.

U.S. Appl. No. 13/342,305, Friedlander et al.—Specification Filed Jan. 3, 2012.

K. Matterhorn, "How to Share Data Between a Host Computer & Virtual Machine," Ehow, pp. 1-3, <http://www.ehow.com/how_7385388_share-host-computer-virtual-machine.html>, Retrieved Feb. 17, 2013.

W. Caid et al., "Context Vector-Based Text Retrieval", Fair Isaac Corporation, Aug. 2003, pp. 1-20.

Anonymous "Fraud Detection Using Data Analytics in the Banking Industry," ACL Services Ltd., 2010, pp. 1-9 <http://www.acl.com/pdfs/DP_Fraud_detection_BANKING.pdf>.

Visual Paradigm, "DB Visual Architect 4.0 Designer'S Guide: Chapter 6—Mapping Object Model to Data Model and Vice Versa", 2007, pp. 6-2-6-26.

Lorenzo Alberton, "Graphs in the Database: SQL Meets Social Networks," Techportal, Sep. 7, 2009, http://techportal.inviqa.com/2009/09/07/graphs-in-the-database-sql-meets-social-networks/, pp. 1-11.

Avinash Kaushik, "End of Dumb Tables in Web Analytics Tools! Hello: Weighted Sort", Sep. 7, 2010, www.kaushik.net, pp. 1-15.

U.S. Appl. No. 13/562,714, Robert R. Friedlander, et al.—Specification and Drawings Filed Jul. 31, 2012.

J. Cheng et al., "Context-Aware Object Connection Discovery in Large Graphs", Data Engineering, 2009. ICDE '09. IEEE 25th International Conference on, pp. 856-867.

R. Angles et al., "Survey of Graph Database Models", ACM Computing Surveys, vol. 40, No. 1, Article 1, Feb. 2008, pp. 1-65.

U.S. Appl. No. 13/342,406—Non-Final Office Action Mailed Sep. 27, 2013.

(56) References Cited

OTHER PUBLICATIONS

U.S. Appl. No. 13/610,347—Non-Final Office Action Mailed Jul. 19, 2013.
U.S. Appl. No. 13/610,347—Notice of Allowance Mailed Aug. 19, 2013.
U.S. Appl. No. 13/592,905—Non-Final Office Action Mailed May 8, 2013.
U.S. Appl. No. 13/733,052—Non-Final Office Action mailed Sep. 18, 2014.
U.S. Appl. No. 13/861,058—Non-Final Office Action mailed Dec. 11, 2014.
U.S. Appl. No. 13/609,710—Final Office Action mailed Jul. 24, 2014.
U.S. Appl. No. 13/755,987—Non-Final Office Action mailed Jan. 2, 2015.
U.S. Appl. No. 13/648,801—Final Office Action mailed Jan. 13, 2015.
G. Begelman et al., "Automated Tag Clustering: Improving Search and Exploration in the TagSpace", Collaborative Tagging Workshop, WWW2006, Edinburgh, Scotland, May 2006, pp. 1-29.
S. Ceri et al., "Model-Driven Development of Context-Aware Web Applications", ACM, ACM Transactions on Internet Technology, 2007, (Abstract Only).
U.S. Appl. No. 13/732,567—Non-Final Office Action mailed Jan. 30, 2015.
U.S. Appl. No. 14/078,135—Notice of Allowance mailed Feb. 24, 2015.
U.S. Appl. No. 13/756,051—Notice of Allowance mailed Feb. 27, 2015.
U.S. Appl. No. 13/732,567—Non-Final Office Action mailed Mar. 26, 2015.
L. Du et al., "A Unified Object-Oriented Toolkit for Discrete Contextual Computer Vision", IEEE, IEEE Colloquium on Pattern Recognition, Feb. 1997, pp. 3/1-3/5. (Abstract Only).
U.S. Appl. No. 13/610,523—Non-Final Office Action mailed Apr. 30, 2015.
U.S. Appl. No. 13/540,267—Non-Final Office Action mailed Jun. 4, 2015.
U.S. Appl. No. 13/609,710—Examiner's Answer mailed Jun. 9, 2015.
U.S. Appl. No. 13/780,779—Non-Final Office Action mailed Apr. 3, 2015.
U.S. Appl. No. 13/896,461—Non-Final Office Action mailed Apr. 21, 2015.
U.S. Appl. No. 13/569,366—Non-Final Office Action mailed Jun. 30, 2015.

* cited by examiner

CONTEXT-BASED NAVIGATION THROUGH A DATABASE

BACKGROUND

The present disclosure relates to the field of computers, and specifically to the use of databases in computers. Still more particularly, the present disclosure relates to a context-based search for data in data nodes in a database.

A database is a collection of data. Examples of database types include hierarchical databases, non-hierarchical databases, relational databases, graph databases, network databases, and object-oriented databases. Each type of database presents data in a non-dynamic manner, in which the data is statically stored.

SUMMARY

In one embodiment of the present invention, a processor-implemented method, system, and/or computer program product navigates through a database. A non-contextual data object, which ambiguously relates to multiple subject-matters, is associated with a context object to define a synthetic context-based object. The context object provides a context that identifies a specific subject-matter, from the multiple subject-matters, of the non-contextual data object. The synthetic context-based object is associated with a first data node and a second data node within a database. In response to receiving a request for identifying and retrieving data from a data node that has a same context as the first data node, data from the second data node is retrieved.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including, but not limited to, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
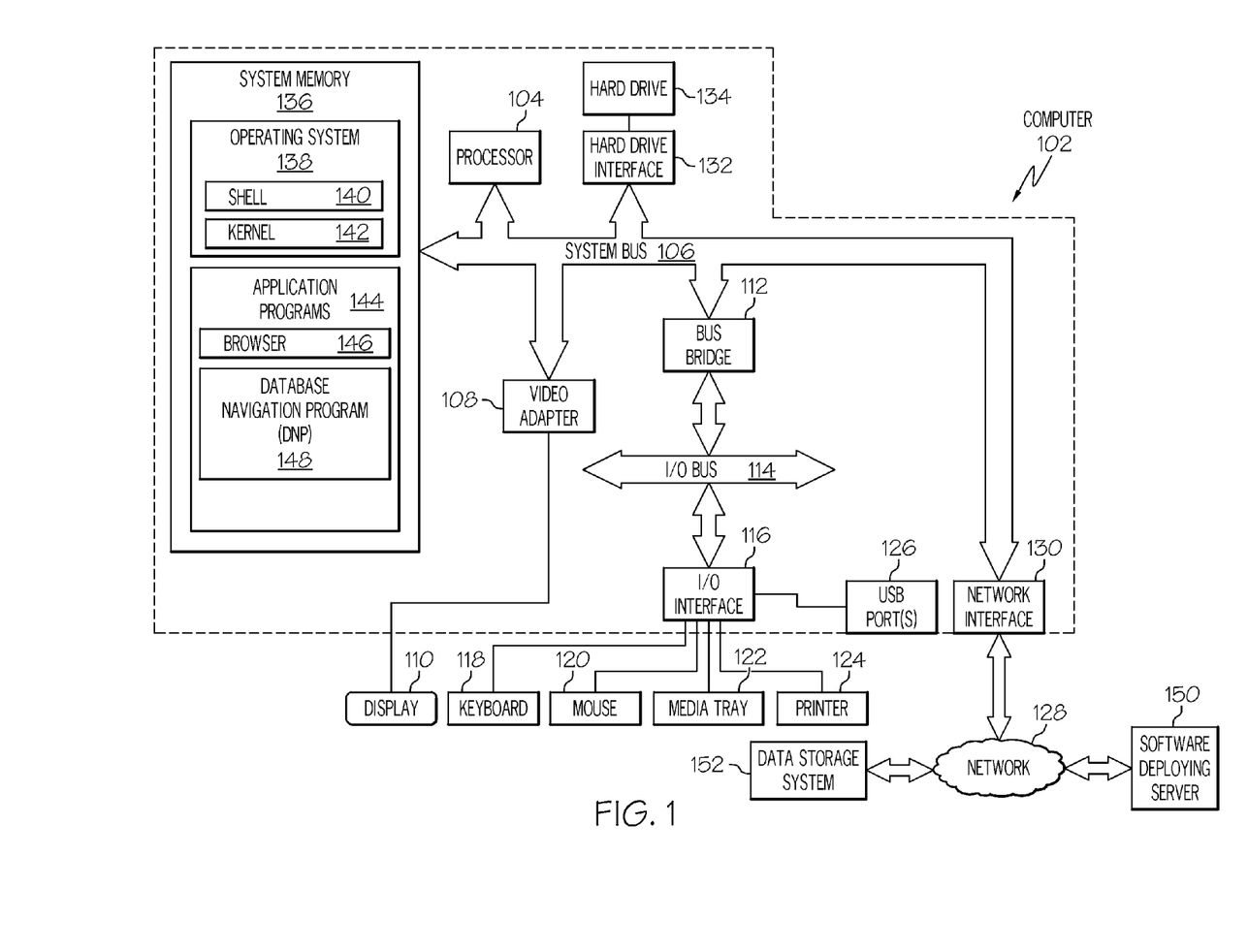
FIG. 1 depicts an exemplary system and network in which the present disclosure may be implemented.

With reference now to the figures, and in particular to FIG. 1, there is depicted a block diagram of an exemplary system and network that may be utilized by and/or in the implementation of the present invention. Note that some or all of the exemplary architecture, including both depicted hardware and software, shown for and within computer 102 may be utilized by software deploying server 150 and/or a data storage system 152.

Exemplary computer 102 includes a processor 104 that is coupled to a system bus 106. Processor 104 may utilize one or more processors, each of which has one or more processor cores. A video adapter 108, which drives/supports a display 110, is also coupled to system bus 106. System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which may include storage devices such as CD-ROM drives, multimedia interfaces, etc.), a printer 124, and external USB port(s) 126. While the format of the ports connected to I/O interface 116 may be any known to those skilled in the art of computer architecture, in one embodiment some or all of these ports are universal serial bus (USB) ports.

As depicted, computer 102 is able to communicate with a software deploying server 150, using a network interface 130. Network interface 130 is a hardware network interface, such as a network interface card (NIC), etc. Network 128 may be an external network such as the Internet, or an internal network such as an Ethernet or a virtual private network (VPN).

A hard drive interface 132 is also coupled to system bus 106. Hard drive interface 132 interfaces with a hard drive 134. In one embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., computer 102) to send and receive network messages to the Internet using hypertext transfer protocol (HTTP) messaging, thus enabling communication with software deploying server 150 and other computer systems.

Application programs 144 in computer 102's system memory (as well as software deploying server 150's system memory) also include a database navigation program (DNP) 148. DNP 148 includes code for implementing the processes described below, including those described in FIGS. 2-8. In one embodiment, computer 102 is able to download DNP 148 from software deploying server 150, including in an on-demand basis, wherein the code in DNP 148 is not downloaded until needed for execution. Note further that, in one embodiment of the present invention, software deploying server 150 performs all of the functions associated with the present invention (including execution of DNP 148), thus freeing computer 102 from having to use its own internal computing resources to execute DNP 148.

The data storage system 152 stores an electronic database, which in one embodiment is a hierarchical database, such as a graph database, a tree database, etc. In one embodiment, computer 102 contains the synthetic context-based object database storage system described and claimed herein, while the database storage system is stored within hierarchical database storage system 152 and/or within computer 102.

Note that the hardware elements depicted in computer 102 are not intended to be exhaustive, but rather are representative to highlight essential components required by the present invention. For instance, computer 102 may include alternate memory storage devices such as magnetic cassettes, digital versatile disks (DVDs), Bernoulli cartridges, and the like. These and other variations are intended to be within the spirit and scope of the present invention.

Figure 2:
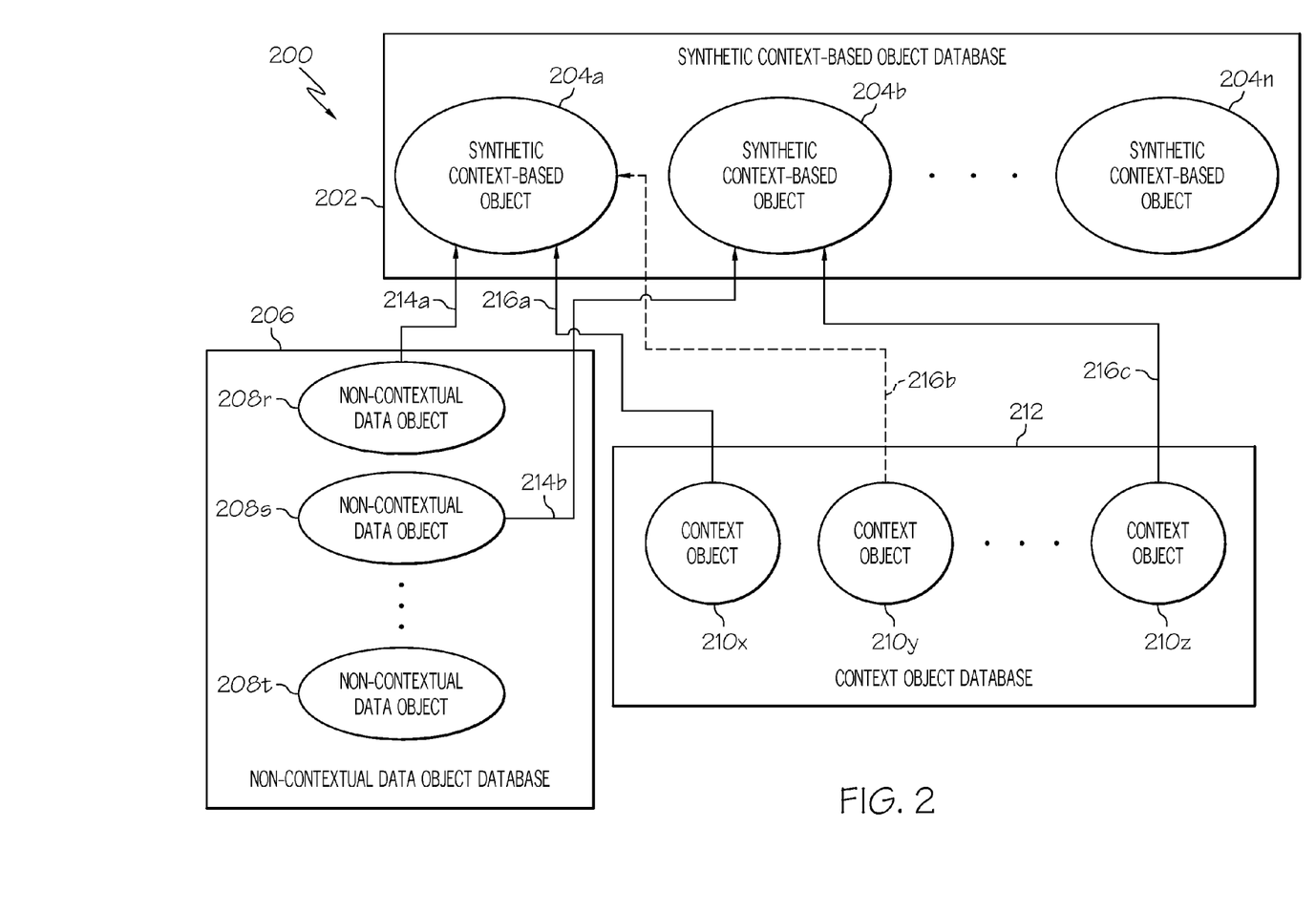
FIG. 2 illustrates a novel context-based system for creating synthetic context-based objects.

Note that DNP 148 is able to generate and/or utilize some or all of the databases depicted in the context-based system 200 in FIG. 2.

With reference now to FIG. 2, a process for generating one or more synthetic context-based objects in a system 200 is presented. Note that system 200 is a processing and storage logic found in computer 102 and/or data storage system 152 shown in FIG. 1, which process, support, and/or contain the databases, pointers, and objects depicted in FIG. 2.

Within system 200 is a synthetic context-based object database 202, which contains multiple synthetic context-based objects 204a-204n (thus indicating an "n" quantity of objects, where "n" is an integer). Each of the synthetic context-based objects 204a-204n is defined by at least one non-contextual data object and at least one context object. That is, at least one non-contextual data object is associated with at least one context object to define one or more of the synthetic context-based objects 204a-204n. The non-contextual data object ambiguously relates to multiple subject-matters, and the context object provides a context that identifies a specific subject-matter, from the multiple subject-matters, of the non-contextual data object.

Note that the non-contextual data objects contain data that has no meaning in and of itself. That is, the data in the context objects are not merely attributes or descriptors of the data/objects described by the non-contextual data objects. Rather, the context objects provide additional information about the non-contextual data objects in order to give these non-contextual data objects meaning. Thus, the context objects do not merely describe something, but rather they define what something is. Without the context objects, the non-contextual data objects contain data that is meaningless; with the context objects, the non-contextual data objects become meaningful.

For example, assume that a non-contextual data object database 206 includes multiple non-contextual data objects 208r-208t (thus indicating a "t" quantity of objects, where "t" is an integer). However, data within each of these non-contextual data objects 208r-208t by itself is ambiguous, since it has no context. That is, the data within each of the non-contextual data objects 208r-208t is data that, standing alone, has no meaning, and thus is ambiguous with regards to its subject-matter. In order to give the data within each of the non-contextual data objects 208r-208t meaning, they are given context, which is provided by data contained within one or more of the context objects 210x-210z (thus indicating a "z" quantity of objects, where "z" is an integer) stored within a context object database 212. For example, if a pointer 214a points the non-contextual data object 208r to the synthetic context-based object 204a, while a pointer 216a points the context object 210x to the synthetic context-based object 204a, thus associating the non-contextual data object 208r and the context object 210x with the synthetic context-based object 204a (e.g., storing or otherwise associating the data within the non-contextual data object 208r and the context object 210x in the synthetic context-based object 204a), the data within the non-contextual data object 208r now has been given unambiguous meaning by the data within the context object 210x. This contextual meaning is thus stored within (or otherwise associated with) the synthetic context-based object 204a.

Similarly, if a pointer 214b associates data within the non-contextual data object 208s with the synthetic context-based object 204b, while the pointer 216c associates data within the context object 210z with the synthetic context-based object 204b, then the data within the non-contextual data object 208s is now given meaning by the data in the context object 210z. This contextual meaning is thus stored within (or otherwise associated with) the synthetic context-based object 204b.

Note that more than one context object can give meaning to a particular non-contextual data object. For example, both context object 210x and context object 210y can point to the synthetic context-based object 204a, thus providing compound context meaning to the non-contextual data object 208r shown in FIG. 2. This compound context meaning provides various layers of context to the data in the non-contextual data object 208r.

Note also that while the pointers 214a-214b and 216a-216c are logically shown pointing towards one or more of the synthetic context-based objects 204a-204n, in one embodiment the synthetic context-based objects 204a-204n actually point to the non-contextual data objects 208r-208t and the context objects 210x-210z. That is, in one embodiment the synthetic context-based objects 204a-204n locate the non-contextual data objects 208r-208t and the context objects 210x-210z through the use of the pointers 214a-214b and 216a-216c.

Figure 3:
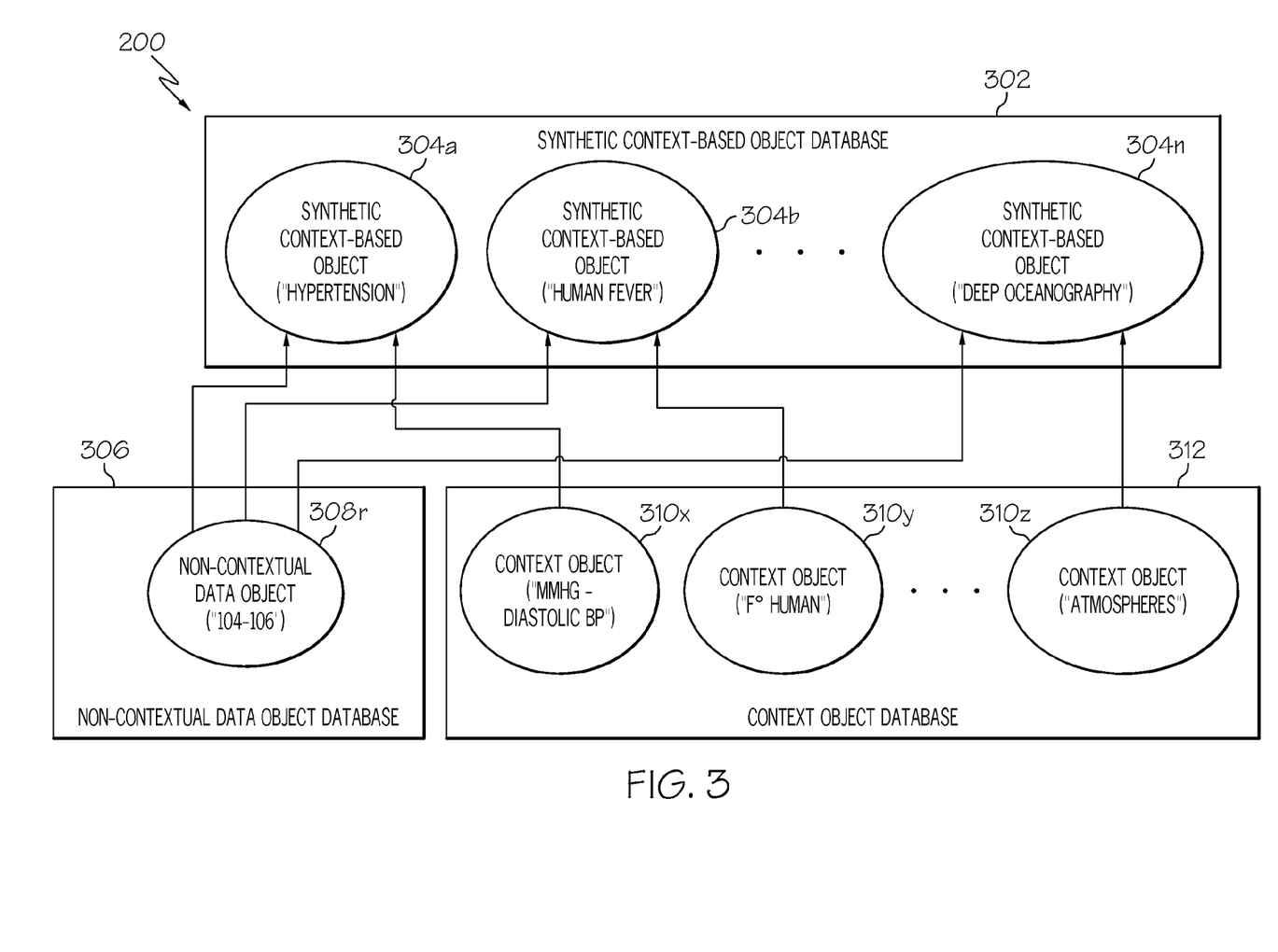
FIG. 3 depicts a creation of synthetic context-based objects that contain purely numerical non-contextual data.

Consider now an exemplary case depicted in FIG. 3, in which the data within a non-contextual data object 308r are merely a combination of numbers and/or letters, and thus are meaningless. In this example, the data "104-106" contained within a non-contextual data object 308r, standing alone without any context, are meaningless, identify no particular subject-matter, and thus are completely ambiguous. That is, "104-106" may relate to subject-matter such as a medical condition, a physics value, a person's age, a quantity of currency, a person's identification number, etc. In this example, the data "104-106" is so vague/meaningless that the data does not even identify the units that the term describes, much less the context of these units.

In the example shown in FIG. 3, then, data (i.e., the term/values "104-106") from the non-contextual data object 308r (found in a non-contextual data object database 306) are associated with (e.g., stored in or associated by a look-up table, etc.) a synthetic context-based object 304a, which is devoted to the subject-matter "hypertension". The term/values "104-106" from non-contextual data object 308r is also associated with a synthetic context-based object 304b, which is devoted to the subject-matter "human fever" and a synthetic context-based object 304n, which is devoted to the subject-matter "deep oceanography". In order to give contextual meaning to the term/values "104-106" (i.e., define the term/values "104-106") in the context of "hypertension", context object 310x, from a context object database 312 and which contains the context data "millimeters of mercury" and "diastolic blood pressure"" is associated with (e.g., stored in or associated by a look-up table, etc.) the synthetic context-based object 304a. Thus, multiple data can provide not only the scale/units (millimeters of mercury) context of the values "104-106", but the data can also provide the context data "diastolic blood pressure" needed to identify the subject-matter (hypertension) of the synthetic context-based object 304a.

Associated with the synthetic context-based object 304b is a context object 310y, which provides the context/data of "degrees on the Fahrenheit scale" and "human" to the term/values "104-106" provided by the non-contextual data object 308r. Thus, the synthetic context-based object 304b now defines term/values "104-106" as that which is related to the subject matter of "human fever". Similarly, associated with the synthetic context-based object 304n is a context object 310z, which provides the context/data of "atmospheres" to the term/values "104-106" provided by the non-contextual data object 308r. In this case, the generator of the synthetic context-based object database 302 determines that high numbers of atmospheres are used to define deep ocean pressures. Thus, the synthetic context-based object 304n now defines term/values "104-106" as that which is related to the subject matter of "deep oceanography".

In one embodiment, the non-contextual data object may provide enough self-context to identify what the datum is, but not what it means and/or is used for. For example, consider the datum "statin" contained within the non-contextual data object 408r from a non-contextual data object database 406 shown in FIG. 4. In the example shown in FIG. 4, datum (i.e., the term "statin") from the non-contextual data object 408r is associated with (e.g., stored in or associated by a look-up table, etc.) a synthetic context-based object 404a, which is now part of a synthetic context-based object database 402 and which is devoted to the subject-matter "cardiology". The term "statin" from non-contextual data object 408r is also associated with a synthetic context-based object 404b, which is devoted to the subject-matter "nutrition" and a synthetic context-based object 404n, which is devoted to the subject-matter "tissue inflammation". In order to give contextual meaning to the term "statin" (i.e., define the term "statin") in the context of "cardiology", context object 410x, from context object database 412 and which contains the context data "cholesterol reducer" is associated with (e.g., stored in or associated by a look-up table, etc.) the synthetic context-based object 444a. Thus, the datum "cholesterol reducer" from context object 410x provides the context to understand that "statin" is used in the context of the subject-matter "cardiology".

Figure 4:
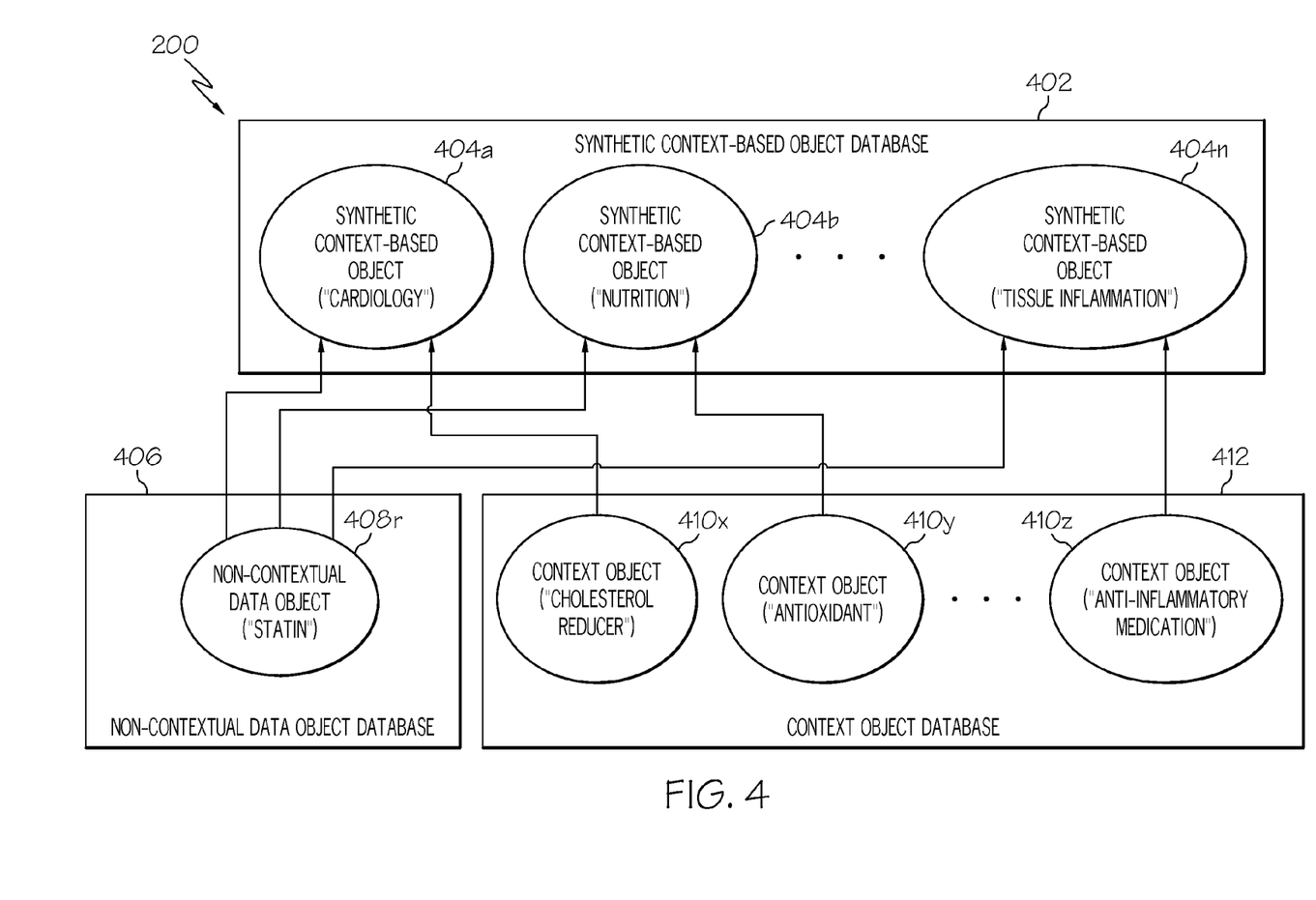
FIG. 4 illustrates a creation of synthetic context-based objects that contain an ambiguous non-contextual term.

Associated with the synthetic context-based object 404b is a context object 410y, which provides the context/datum of "antioxidant" to the term "statin" provided by the non-contextual data object 408r. That is, a statin has properties both as a cholesterol reducer as well as an antioxidant. Thus, a statin can be considered in the context of reducing cholesterol (i.e., as described by the subject-matter of synthetic context-based object 404a), or it may considered in the context of being an antioxidant (i.e., as related to the subject-matter of synthetic context-based object 404b). Similarly, a statin can also be an anti-inflammatory medicine. Thus, associated with the synthetic context-based object 404n is the context object 410z, which provides the context/data of "anti-inflammatory medication" to the term "statin" provided by the non-contextual data object 408r. This combination identifies the subject-matter of the synthetic context-based object 404n as "tissue inflammation".

Figure 5:
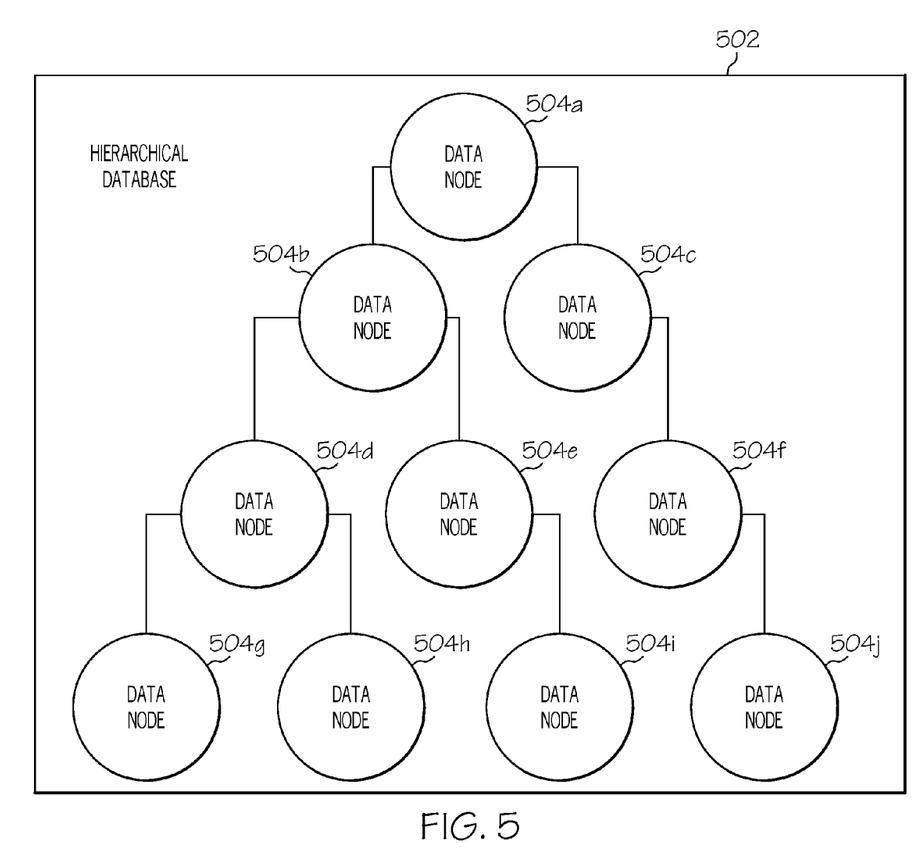
FIG. 5 depicts a hierarchical database in which certain data nodes are associated with a specific synthetic context-based object.

Once the synthetic context-based objects are defined, they can be linked to specific nodes, including data nodes in a hierarchical database and/or a non-hierarchical database. With reference now to FIG. 5, an exemplary hierarchical database 502, which is contained within a hierarchical database server such as data storage system 152 shown in FIG. 1, contains multiple data nodes 504a-504j (indicating a "j" number of data nodes, where "j" is an integer).

In an embodiment in which the hierarchical database 502 is a graph database, such a graph database is a schema-less database in which data is organized as a set of nodes (objects) with properties (attributes or values). These nodes are linked to other nodes through edges, which describe the relationship between two nodes. Regardless of whether the hierarchical database 502 is a graph database or another type of hierarchical database, the data nodes 504a-504j in the hierarchical database are organized hierarchically (as the name "hierarchical database" indicates). That is, data node 504a is at the top of the hierarchy, and is a parent data node to lower data nodes 504b-504c in a second tier. Similarly, data nodes 504b and 504c are over data nodes 504d-504f in a third tier, while data nodes 504d-504f are over data nodes 504g-504j in a fourth (bottom) tier. Thus, each parent data node (from a higher tier) can have many children data nodes (from one or more lower tiers). The hierarchical database 502 depicted in FIG. 5 contains parent nodes that have a 1-to-many relationship with their children, grandchildren, great-grandchildren, etc. nodes, in which each parent data node has many children, but each child data node has only one parent data node. Alternatively, the hierarchical database 502 may have children nodes that are linked to one or more parent nodes. Such a database (not depicted) is described as having parent/child nodes that have a many-to-many relationship.

Note that a higher hierarchy is defined as containing a parent data node that describes data from multiple child data nodes. Similarly, multiple child data nodes from a lower hierarchy contain data that is inclusively described by data in a parent node. This parent node may be shared by sibling data nodes (i.e., data nodes within a same hierarchy that are all subordinate to the parent node), and/or the parent node may be shared by multi-generational (i.e., children, grand-children, etc.) data nodes.

In a traditional hierarchical database search, the data nodes must be traversed sequentially whether navigating up or down through hierarchies. For example, in order to obtain the data from data node 504j when starting at data node 504a, the link from data node 504a to data node 504c must first be traversed, followed by "traveling" down to data node 504f and then finally arriving at data node 504j. This "traveling" is accomplished by the use of pointers that create a data pathway from the data node 504a to the target data node 504j. In this example, the data pathway would look something like datanode504a/datanode504c/datanode504f/datanode504j. (Note that this type of data pathway may also be used by a non-hierarchical database, in which different data nodes are logically connected by the data pathway.) Traversal through nodes in the hierarchical database 502 by using such a data pathway is slow and expensive in terms of processing time/resources. However, one or more of the data nodes 504a-504j shown in the hierarchical database 502 are novel in that they contain references to one or more of the synthetic context-based objects described herein.

Figure 6:
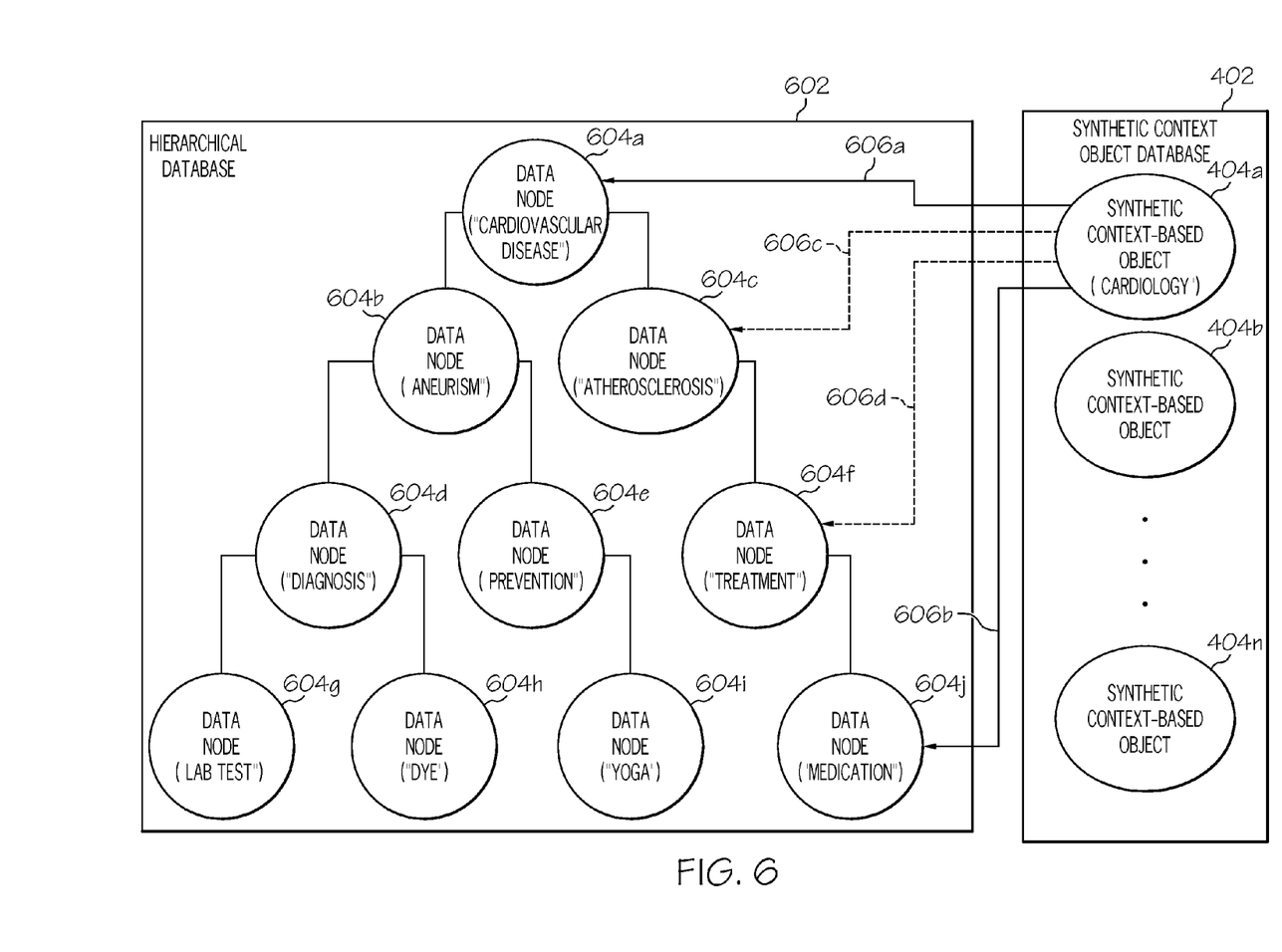
FIG. 6 illustrates a use of a synthetic context-based object to navigate through a hierarchical database.

For example, consider hierarchical database 602 shown in FIG. 6. The data nodes 604a-604j are organized in a manner that is similar to that described above for data nodes 504a-504j shown in FIG. 5. That is, data node 604a is in a top tier/hierarchy, while data nodes 604b-604c are in the next lower tier/hierarchy, data nodes 604d-604f are in the still lower tier/hierarchy, and data nodes 604g-604j are in the bottom tier/hierarchy. As noted above, one or more of these data nodes also contain, or at least point to or otherwise relate to/from (e.g., via a lookup table, set of pointers, etc.) a particular synthetic context event node.

In the example shown in FIG. 6, assume that the top data node 604a contains data about all types of "cardiovascular disease". As suggested by the name, "cardiovascular diseases" include diseases of the heart ("cardio") and blood vessels ("vascular"). As such, associating the synthetic context-based object 404a with data node 604a indicates that the context of data in the data node 604a in one embodiment is "cardiology". In order to find medication used to treat "atherosclerosis" (a disease related to "cardiology"), the present invention allows a user to "jump" to data node 604j (containing data about medication used to treat atherosclerosis), rather than traversing through data nodes 604c and 604f. This "jumping" is accomplished by pointers 606a and 606b. Pointers 606a/606b point from synthetic context-based object 404a, which as described above contains the non-contextual data object 408r for "statin", as well as the context object 410x for "cholesterol reducer", which together give the context for the synthetic context-based object 404a ("cardiology").

Note that while all of the data nodes 604a-604j are related to some variation of the context "cardiovascular disease", only data nodes 604a and 604j (and in one embodiment, data nodes 604c and 604f) have been previously determined to be related to the context of "cardiology". Data nodes 604b, 604d, 604e, 604g, 604h, and 604i, however, are all within the context of "vascular diseases".

As described herein, "jumping" directly from data node 604a to data node 604j without traversing through data nodes 604c and 604f (e.g., through the use of pointers 606a-606b, which point to a memory address, identifier, etc. used by data nodes 604*a* and 604*f*) allows data node 604*j* to be located without the use of a node pathway from the data node 604*a* to data node 604*j*.

In one embodiment, the association of the context of the synthetic context-based object 404*a* with the context of the data nodes 604*a* and 604*j* is manually accomplished by a user deciding that synthetic context-based object 404*a* and these two data nodes 604*a* and 604*j* have the same context ("cardiology"). However, in another embodiment, this correlation is performed intelligently by computer logic (e.g., DNP 148 shown in FIG. 1).

In one embodiment, this correlation is made by the computer logic data mining and analyzing mined data from data nodes 604*a* and 604*j*. For example, if certain combinations of words are found in both data nodes 604*a* and 604*j*, then computer logic (e.g., DNP 148 shown in FIG. 1) will determine that these nodes are related to the context of "cardiology". Note, however, that this is not merely a data search for key words within data nodes 604*a* and 604*j*. That is, synthetic context-based object 404*a* will point to data nodes 604*a* and 604*j* if there is a match of the context ("cardiology", as determined by DNP 148), rather than there simply being a match of key words found in data nodes 604*a* and 604*j*. In one embodiment, the context identifier (which is created after the context of the data node is determined) is not a word/term (e.g., "cardiology"), but rather is a flag, symbol, or other non-textual marker that indicates that data nodes 604*a* and 604*j* and synthetic context-based object 404*a* share a same context and/or subject matter.

Note that in one embodiment, in which the correlation of the particular synthetic context-based object and one or more data nodes is intelligently performed by computer logic, the context of one or more data nodes is independent of the actual data stored in the data node. That is, rather than determining the context of the data node according to the data itself (through data mining as described above), the context of the data node is determined by non-data factors.

In one embodiment, the non-data factor used to determine the context of the data stored within the data node is the source of the data that is stored in the data node. Thus, if the data that is stored within a data node came from a journal on cardiology, then the context of the data node would be "cardiology" rather than "vascular diseases".

In one embodiment, the non-data factor used to determine the context of the data stored within the data node is the data channel that was used to populate the data node. For example, data delivered by a cell phone network is determined to have a different context than data delivered over a high-speed internet connection. That is, the cell phone network is more apt to deliver smaller amounts of data than the high-speed internet connection. Thus, if the term "heart" is found in a cell phone network transmission (e.g., a cell phone text message), the context of the term "heart" is less likely to be related to scientific details on how to perform heart surgery (which is more likely to be found in a data transmission on a high-speed internet connection) and is more likely to be related to "affection".

In one embodiment, the non-data factor used to determine the context of the data stored within the data node is the type of device that is used to receive and/or store the data that populates the data node. For example, if the term "heart" is stored in a cell phone, the context is likely to be "affection." If the term "heart" is stored in a tablet computer, the context is likely to be "mainstream news reports". If the term "heart" is stored in a server of a medical school, the context is likely to be "surgical procedures" or other cardiology-related subjects.

In one embodiment, the non-data factor used to determine the context of the data stored within the data node is the format of the data that populates the data node. For example, if the data is a music file that contains a lyric "heart" (e.g., which is determined by converting the music file into a text file), then the context is likely to be "affection." If the data is an original text file that contains the term "heart", then the context is likely to be "medical science".

While the present invention has been demonstrated in the context of a hierarchical database 602 in FIG. 6, the use of a synthetic context-based object to point to data nodes having a same context is also useful in non-hierarchical databases. For example, consider the non-hierarchical database 702 depicted in FIG. 7, which includes data nodes 704*a*-704*j* (where "j" is an integer, indicating a "j" number of nodes), and which is contained within a non-hierarchical database server such as data storage system 152 shown in FIG. 1.

Figure 7:
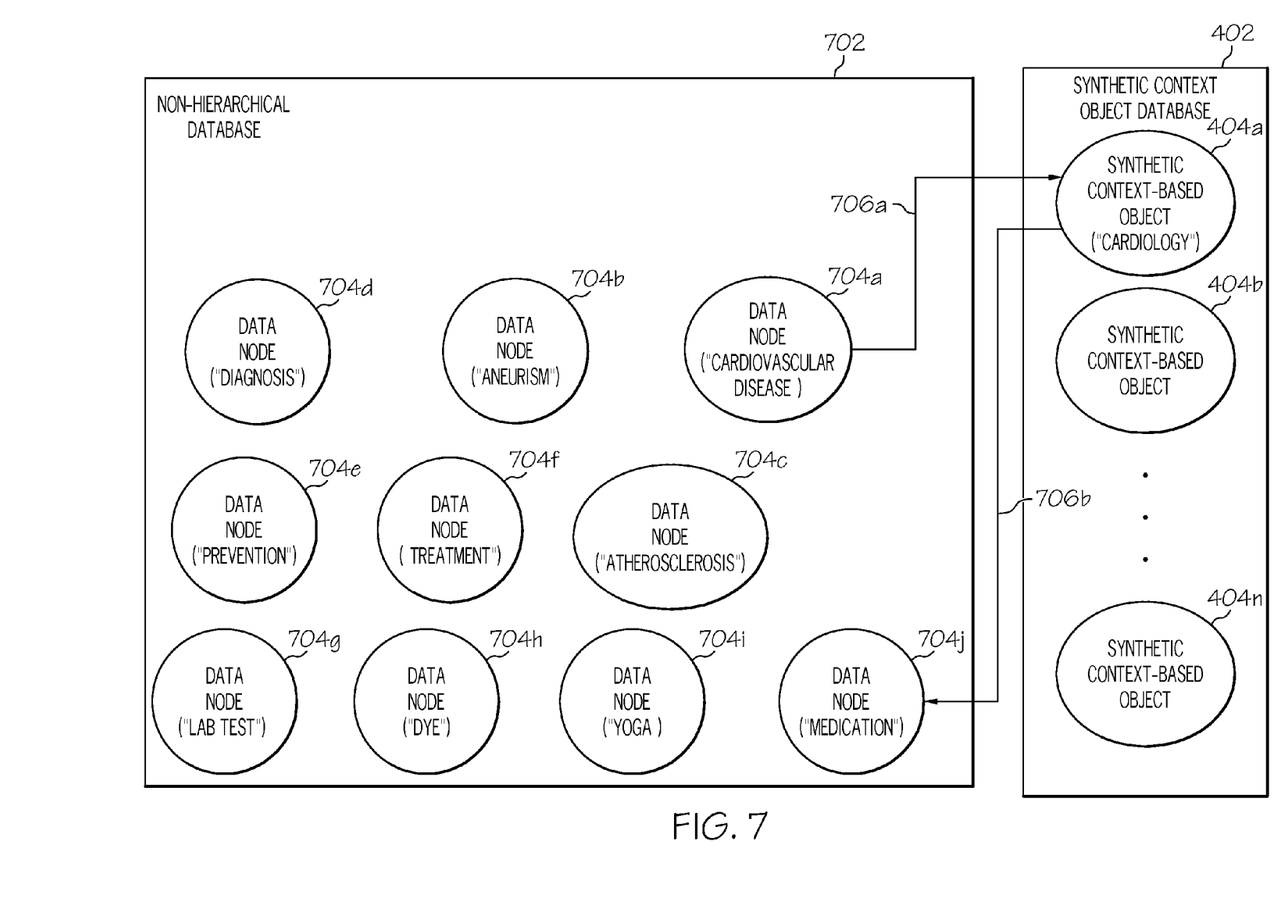
FIG. 7 illustrates a use of a synthetic context-based object to navigate through a non-hierarchical database.

In one embodiment, the non-hierarchical database 702 is a relational database, which is a collection of data items (i.e., the data nodes 704*a*-704*j*) organized through a set of formally described tables. A table is made up of one or more rows, known as "tuples". Each of the tuples share common attributes, which in the table are described by column headings. Each tuple also includes a key, which may be a primary key or a foreign key. A primary key is an identifier (e.g., a letter, number, symbol, etc.) that is stored in a first data cell of a local tuple. A foreign key is typically identical to the primary key, except that it is stored in a first data cell of a remote tuple, thus allowing the local tuple to be logically linked to the foreign tuple.

In one embodiment, the non-hierarchical database 702 is an object oriented database, which stores objects (i.e., the data nodes 704*a*-704*j*). As understood by those skilled in the art of computer software, an object contains both attributes, which are data (i.e., integers, strings, real numbers, references to another object, etc.), as well as methods, which are similar to procedures/functions, and which define the behavior of the object. Thus, the object oriented database contains both executable code and data.

In one embodiment, the non-hierarchical database 702 is a spreadsheet, which is made up of rows and columns of cells. Each cell (i.e., one of the data nodes 704*a*-704*j*) contains numeric or text data, or a formula to calculate a value based on the content of one or more of the other cells in the spreadsheet.

Thus, as depicted in FIG. 7, data node 704*a* and data node 704*j* have been deemed to be related to the context of "cardiology". Thus, if a request is made (e.g., in the form of a data stream the contains data/instructions to be processed by a receiving processor) to identify and retrieve data from a data node that has the same context as that of data node 704*a*, then a pointer 706*a* points to synthetic context-based object 404*a*, which has a same context indicator/flag/symbol as that found in data node 704*a*. This same context indicator/flag/symbol (for "cardiology") is also found in data node 704*j*, and thus pointer 706*b* points to data node 704*j*. The data from data node 704*j* is then returned to the requester.

Note that in one embodiment, the request may simply be a request for any data node (hierarchical or non-hierarchical) that has a same context as that found in synthetic context-based object 404*a*. In this embodiment, pointers 706*a* and 706*b* would point to, and thus enable retrieval of data from, respective data nodes 704*a* and 704*j*.

Figure 8:
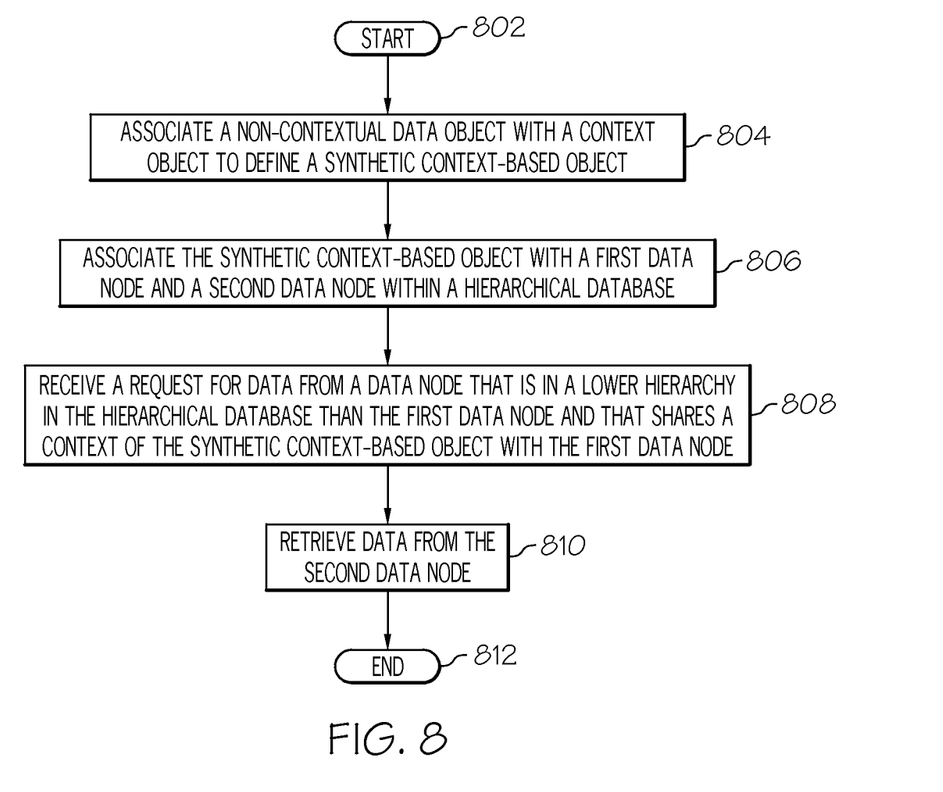
FIG. 8 is a high-level flow chart of one or more steps performed by a computer processor to navigate through a hierarchical database through the use of a synthetic context-based object.

With reference now to FIG. 8, a high-level flow chart of one or more steps performed by a computer processor to navigate through a hierarchical database through the use of a synthetic context-based object is presented. After initiator block 802, a non-contextual data object is associated by a processor with a context object to define a synthetic context-based object (block 804). This non-contextual data object ambiguously relates to multiple subject-matters. However, the context object provides a context that identifies a specific subject-matter, from the multiple subject-matters, of the non-contextual data object, as described herein.

As described in block 806, the processor associates the synthetic context-based object with a first data node and a second data node within a hierarchical database, as depicted in exemplary detail above in FIG. 6. The first data node is in a first hierarchy in the hierarchical database, the second data node is in a second hierarchy in the hierarchical database, and the first hierarchy is higher than the second hierarchy. In one embodiment, at least one intermediate hierarchy is between the first hierarchy and the second hierarchy.

As described in block 808, the processor receives a request for data that is in a data node that 1) is in a lower hierarchy in the hierarchical database than the first data node and 2) shares a context of the synthetic context-based object with the first data node. As described in block 810, the processor utilizes a pointer from the synthetic context-based object to the second data node to retrieve data from the second data node. Thus, the second data node is located without use of a node pathway from the first data node to the second data node. The process ends at terminator block 812.

In one embodiment, the processor associates the synthetic context-based object with all data nodes in a pathway from the first data node to the second data node within a hierarchical database. For example, a pointer 606c points to a data node 604c, and a pointer 606d points to a data node 604f, both of which are in intermediate hierarchies between data node 604a and data node 604j shown in FIG. 6. In one embodiment, all data nodes in these intermediate hierarchies (e.g., data node 604c and data node 604f) contain context data that is contained within the synthetic context-based object (e.g., synthetic context-based object 404a). In another embodiment, however, these intermediate hierarchy data nodes do not contain context data that is contained within the synthetic context-based object. Thus, when retrieving data from these intermediate hierarchy data nodes that do not contain context data that is contained within the synthetic context-based object, the context from the synthetic context-based object is imposed on these intermediate hierarchy data nodes. In either embodiment, in response to receiving the request, the processor returns data from all data nodes in a pathway from the first data node to the second data node within the hierarchical database. In one embodiment, this imposition of the context on data nodes 604c and 604f results in data from these nodes being returned whenever a data search, which is made via the synthetic context-based object 404a, is performed.

In one embodiment, rather than associating the intermediate hierarchy data nodes with the context found in the synthetic context-based object, an association of the synthetic context-based object with specific data nodes in said at least one intermediate hierarchy in the hierarchical database is blocked by the processor. In this embodiment, when responding to the request for data from a lower-tiered (i.e., from a lower hierarchy) data node, the processor returns data from all data nodes in a pathway from the first data node to the second data node within the hierarchical database, except for these specific data nodes that have been blocked from associating with (e.g., being pointed to) the synthetic context-based object.

Note that in one embodiment, locating data nodes that have a same context as the synthetic context-based object is achieved by receiving a request for any data node that has this same context. Thus, the request is first received at the synthetic context-based object, which then points to (using pointers as described herein) any data node (in the database) that has the same context as the synthetic context-based object that is handling the data/data node request.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

Note further that any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A processor-implemented method of navigating through a hierarchical database, the processor-implemented method comprising:

associating, by a processor, a non-contextual data object with a context object to define a synthetic context-based object, wherein the non-contextual data object ambiguously relates to multiple subject-matters, and wherein the context object provides a context that identifies a specific subject-matter, from the multiple subject-matters, of the non-contextual data object;

associating, by the processor, the synthetic context-based object with a first data node and a second data node within a database, wherein the first data node is in a first hierarchy in the hierarchical database, wherein the second data node is in a second hierarchy in the hierarchical database, wherein the first hierarchy is higher than the second hierarchy, and wherein at least one intermediate hierarchy is between the first hierarchy and the second hierarchy;

associating, by the processor, the synthetic context-based object with all data nodes in a pathway from the first data node to the second data node within the hierarchical database, wherein said all data nodes in said at least one intermediate hierarchy contain context data that is contained within the synthetic context-based object;

receiving, by the processor, a data stream that invokes a request to identify and retrieve data from a data node that is contextually associated with the first data node; and in response to receiving the request, the processor returning data from said all data nodes in the pathway from the first data node to the second data node within the hierarchical database.

2. The processor-implemented method of claim 1, further comprising:

identifying the second data node and retrieving data from the second data node through a use of a pointer from the synthetic context-based object to the second data node.

3. The processor-implemented method of claim 1, further comprising:

the processor locating the second data node without use of a node pathway from the first data node to the second data node.

4. The processor-implemented method of claim 1, wherein the first data node and the second data contain context data contained within the synthetic context-based object, and wherein the processor-implemented method further comprises:

associating, by the processor, the synthetic context-based object with all data nodes in said at least one intermediate hierarchy, wherein said all data nodes in said at least one intermediate hierarchy do not contain context data that is contained within the synthetic context-based object; and in response to receiving the request, the processor retrieving data from all data nodes in a pathway from the first data node to the second data node within the hierarchical database.

5. The processor-implemented method of claim 1, further comprising:

blocking, by the processor, an association of the synthetic context-based object with specific data nodes in said at least one intermediate hierarchy in the hierarchical database; and in response to receiving the request, the processor retrieving data from all data nodes, except for said specific data nodes, in a pathway from the first data node to the second data node within the hierarchical database.

6. The processor-implemented method of claim 1, further comprising:

determining a context of data that is stored in the first data node and the second data node according to a source of the data that is stored in the first data node and the second data node; and associating the synthetic context-based object with the first data node and the second data node by matching the context of data that is stored in the first data node and the second data node with a context of the synthetic context-based object.

7. The processor-implemented method of claim 1, further comprising:

determining a context of data that is stored in the first data node and the second data node according to a data channel that was used to populate the first data node and the second data node with data; and associating the synthetic context-based object with the first data node and the second data node by matching the context of data that is stored in the first data node and the second data node with a context of the synthetic context-based object.

8. The processor-implemented method of claim 1, further comprising:

determining a context of data that is stored in the first data node and the second data node according to a data channel used by data that is stored in the first data node and the second data node; and associating the synthetic context-based object with the first data node and the second data node by matching the context of data that is stored in the first data node and the second data node with a context of the synthetic context-based object.

9. The processor-implemented method of claim 1, further comprising:

determining a context of data that is stored in the first data node and the second data node according to a type of device that is used to receive and store data in the first data node and the second data node with data; and associating the synthetic context-based object with the first data node and the second data node by matching the context of data that is stored in the first data node and the second data node with a context of the synthetic context-based object.

10. The processor-implemented method of claim 1, further comprising:

determining a context of data that is stored in the first data node and the second data node according to a format of the data that is stored in the first data node and the second data node; and associating the synthetic context-based object with the first data node and the second data node by matching the context of data that is stored in the first data node and the second data node with a context of the synthetic context-based object.

11. A computer program product for navigating through a hierarchical database, the computer program product comprising a non-transitory computer readable storage medium having program code embodied therewith, the program code readable and executable by a processor to perform a method comprising:

associating a non-contextual data object with a context object to define a synthetic context-based object, wherein the non-contextual data object ambiguously relates to multiple subject-matters, and wherein the context object provides a context that identifies a specific subject-matter, from the multiple subject-matters, of the non-contextual data object;

associating the synthetic context-based object with a first data node and a second data node within a database, wherein the first data node is in a first hierarchy in the hierarchical database, wherein the second data node is in a second hierarchy in the hierarchical database, wherein the first hierarchy is higher than the second hierarchy, and wherein at least one intermediate hierarchy is between the first hierarchy and the second hierarchy;

associating the synthetic context-based object with all data nodes in a pathway from the first data node to the second data node within the hierarchical database, wherein said all data nodes in said at least one intermediate hierarchy contain context data that is contained within the synthetic context-based object;

receiving a data stream that invokes a request to identify and retrieve data from a data node that is contextually associated with the first data node; and in response to receiving the request, returning data from said all data nodes in the pathway from the first data node to the second data node within the hierarchical database.

12. The computer program product of claim 11, wherein the first data node and the second data node are data nodes within a graph database, and wherein the second data node is located without use of a node pathway from the first data node to the second data node.

13. A computer system comprising:

a processor, a computer readable memory, and a computer readable storage medium;

first program instructions to associate a non-contextual data object with a context object to define a synthetic context-based object, wherein the non-contextual data object ambiguously relates to multiple subject-matters, and wherein the context object provides a context that identifies a specific subject-matter, from the multiple subject-matters, of the non-contextual data object;

second program instructions to associate the synthetic context-based object with a first data node and a second data node within a hierarchical database, wherein the first data node is in a first hierarchy in the hierarchical database, wherein the second data node is in a second hierarchy in the hierarchical database, wherein the first hierarchy is higher than the second hierarchy, and wherein at least one intermediate hierarchy is between the first hierarchy and the second hierarchy;

third program instructions to receive a request to identify and retrieve data from a data node that is contextually associated with the first data node;

fourth program instructions to associate the synthetic context-based object with all data nodes in a pathway from the first data node to the second data node within the hierarchical database, wherein said all data nodes in said at least one intermediate hierarchy contain context data that is contained within the synthetic context-based object; and fifth program instructions to, in response to receiving the request, return data from said all data nodes in the pathway from the first data node to the second data node within the hierarchical database; and wherein the first, second, third, fourth, and fifth program instructions are stored on the computer readable storage medium for execution by the processor via the computer readable memory.

14. The computer system of claim 13, further comprising:

sixth program instructions to identify the second data node and to retrieve data from the second data node through a use of a pointer from the synthetic context-based object to the second data node; and wherein the sixth program instructions are stored on the computer readable storage medium for execution by the processor via the computer readable memory.

15. The computer system of claim 13, wherein the first data node and the second data node are data nodes within a graph database, and wherein the second data node is located without use of a node pathway from the first data node to the second data node.

* * * * *